Patented June 26, 1928.

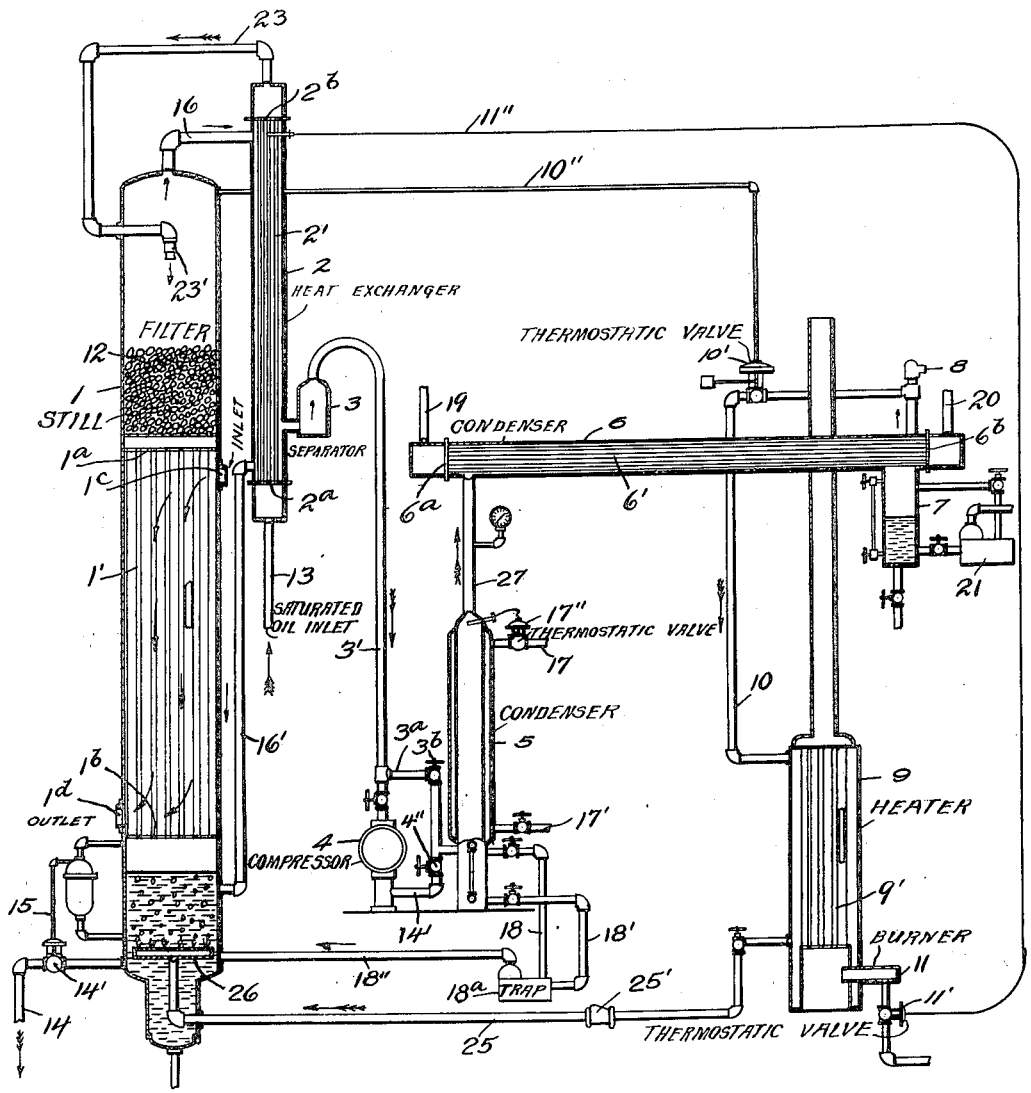

1,674,852

UNITED STATES PATENT OFFICE.

ALEXANDER CLARKE, OF CHARLESTON, WEST VIRGINIA, ASSIGNOR TO UNITED HYDROCARBONS COMPANY, OF CHARLESTON, WEST VIRGINIA, A CORPORATION OF WEST VIRGINIA.

METHOD AND MECHANISM FOR CONTINUOUSLY DISTILLING AND CONDENSING HYDROCARBONS.

Application filed August 9, 1921. Serial No. 490,845.

This invention comprises a method and mechanism for continuously recovering liquid hydrocarbons from a medium saturated therewith, and is particularly designed for the treatment of an absorbent liquid, such as mineral seal oil, which has been saturated with gasoline by intimate contact with casing head gas or natural gas. In the practice of my improved method, such saturated medium is distilled at low temperature (preferably below the final boiling point of the distillate) and at low pressure (preferably below atmospheric pressure) and the vapors subjected to pressure and condensation for the recovery of the gasoline content. The vapors which remain uncondensed are heated and returned to the still for further treatment and serve as a carrier which heats, entrains and carries through the still gasoline forming vapors released from saturated oil fed in films through the still, thereby avoiding the necessity for using steam in the still. The vapors discharged from the still, before being subjected to compression, are given a preliminary cooling treatment sufficient to cause condensation of absorbent liquid and very heavy ends of gasoline which have been carried over from the still by entrainment with the lighter fractions, but without condensing the bulk of the vaporized gasoline. This heavy condensate, which contains no substantial portion of the desirable gasoline, is returned directly to the still, as are also other undesirable condensates which may be extracted from the vapors before final condensation.

The characteristic features of the invention and the advantages thereof will appear from the following description and the accompanying drawing in illustration thereof.

The drawing is a diagrammatic illustration in part sectional elevation of a mechanism adapted for the practice of the invention.

Referring to the drawing, in the preferred practice of the invention saturated oil is delivered through a pipe 13 to a heat exchanger and fractionating column 2 containing tubes 2' having their ends set in headers 2ª and 2ᵇ, the oil discharged from the tubes being carried through the pipe 23 to a nozzle 23' which sprays it in the top of a still 1.

The still 1 holds in the upper part thereof beneath the nozzle 23' a filter bed 12 of broken stone, beneath which is a set of tubes 1' having their ends fixed in the respective headers 1ª and 1ᵇ, the oil sprayed by the nozzle flowing through the filter bed (the stones forming the same being coated therewith) and thence downwardly through the tubes into the bottom of the still.

A pipe 16 connects the top of the still 1 with the top of the column 2 below the header 2ᵇ, exterior to the tubes 2' therein, and a pipe 16' connects the bottom of this column, above the header 2ª exterior to the tubes, with the bottom of the still 1 below the header 1ᵇ, thus providing a circuit between the top and the bottom of the still through the column exterior to the tubes to provide for heat exchange between fluids flowing counter current through said column.

Heating fluid, preferably the hot waste gases from the prime movers of the plant, are delivered through the inlet 1ᶜ of the still 1, between the headers 1ª and 1ᵇ, such heating fluid impinging upon the tubes 1' and effecting through the walls thereof heat transfer to the fluid flowing therein, the heating gases being discharged from the still through the outlet 1ᵈ.

A separator 3 is connected with the column 2 between the headers 2ª and 2ᵇ and between the pipes 16 and 16'. This separator is connected by a pipe 3' with a compressor 4, which is connected by a pipe 4', controlled by a valve 4'', with a condenser 5. A pipe 3ª, controlled by a valve 3ᵇ, connects the pipe 3' with the pipe 4' between the valve 4'' and the condenser 5, to provide means for bypassing the compressor 4. Vapor discharged from the top of the separator 3 is passed to the condenser 5 either directly through the pipe 3ª, or through the compressor 4 and the pipe 4'. The liquid separated from the vapor in the separator 3 flows back to the column 2, and the oil or heavy liquid hydrocarbon in the column is returned through the pipe 16' into the bottom of the still 1.

The action of the condenser 5 upon the vapors passing therethrough to the discharge conduit 27 is regulated by regulating the flow of a cooling medium from the pipe 17 through the condenser casing to the discharge pipe 17'. The flow of the cooling medium may be automatically controlled by the thermostatically operated valve mechanism 17'' controlled by the temperature of the vapors flowing through the condenser.

Liquid is returned to the bottom of the still 1 from the bottom of the condenser 5 by the pipes 18, 18', the automatic trap 18ª and the pipe 18''.

The pipe 27 delivers the vapors from the condenser 5 to the condenser 6 in contact with the outer walls of tubes 6' having their respective ends connected by headers 6ª and 6ᵇ. Cooling fluid flows through this condenser and the tubes 6' therein from the inlet pipe 20 to the discharge pipe 19.

The condensed liquid hydrocarbon is delivered from the condenser 6 to the reservoir 7 and is taken off therefrom through the trap 21. The uncondensed fluid or vapor is discharged from the condenser 6 through the pipe 10 under control of an automatic regulator 10' to a reheater 9, the regulator being operated thermostatically by a connection 10'' with the top of the still 1. The pressure in the condensers may be controlled by an automatic valve 8, through which any excess of uncondensed vapors may be discharged.

The reheater 9 contains a set of fire tubes 9' in contact with which the uncondensed fluid, delivered by the pipe 10, flows. The reheater is heated by means of a fuel burner 11 controlled by a valve 11'' thermostatically regulated by a connection 11'' with the column 2.

The temperatures employed in the still and in the reheater 9 for the gases and vapors recirculated to the still will depend somewhat upon the nature of the absorption medium employed. When mineral seal oil is used as the absorption medium the temperature in the still is preferably between 300 and 500° F., temperatures in the neighborhood of 325-375° F. giving advantageous results, and the temperature in the reheater may vary between 300° F. and 700° or 800° F. and is advantageously maintained in the neighborhood of 400° F. Beneficial operation may result from temperatures in the still and reheater that are lower than those mentioned but better results are usually obtainable by the use of the temperatures specified.

The uncondensed vapors, heated in the reheater 9, flow through the pipe 25, to a perforated header 26 disposed in the bottom of the still 1 below the level of the liquid therein reverse flow through the pipe 25 being prevented by a check valve 25'. The liquid level in the bottom of the still is automatically controlled by a valve 14' in the discharge pipe 14 and a conventional regulator 15 connected with the bottom of the still above and below the desired level of such liquid therein.

These vapors or gases that are recirculated are principally hydrocarbons that would ordinarily be in vapor form at atmospheric temperature and pressure, and which will not remain separately in liquid form when exposed to those conditions even though they have been liquefied by cooling under pressure.

The heated vapors discharged from the header 26 bubble up through the liquid in the bottom of the still and flow thence upwardly, counter current to the saturated oil, through the heating tubes 1', the oil coated bed of stones 12 and spray of heated oil in the top of the still. Gasoline vapors from the oil are thus picked up and carried by the ascending preheated vapors throughout their courses through the still, the oil being disseminated to facilitate extended contact.

The vapors in the top of the still 1 are discharged therefrom through the pipe 16 to the heat exchanger 2, being fractionated, separated and conveyed through the respective parts of the apparatus as previously described.

The compressor (4), above referred to, is designed to develop adequate pressure in the system in order to secure the advantageous results in the practice of this invention. In the compression step it is desirable to increase the pressure as much as possible, and this increase should if practicable be effected in a single compression. Pressures in the neighborhood of 250 pounds gauge will give highly advantageous results, while results of substantial value are obtainable from such readily produced pressures as 60 to 80 pounds; even some advantage is obtained at pressures of 25 pounds.

It will be seen that the system of distillation described can be used for the recovery of gasoline or other liquefiable hydrocarbons in connection with plants treating either dry or casing head gas or coal by-products, by direct heating and entraining of volatile constituents at temperatures below the boiling point of the distillate, and at pressures not exceeding and preferably below atmospheric, without the admission into the still of steam or any distilling medium other than the by-product of distillation. The hydrocarbon vapors that are non-condensable at usual operating pressures and temperatures are utilized as a carrier for the heavier hydrocarbons and at the same time effect the desired result at temperatures below those normally required for distillation. The unvaporized oil that is entrained by the carrier is conveniently separated from the vapors carried therewith and returned to the still. The system provides for the continued circulation and utilization of the constituents that have not been brought to the desired character and drawn off so that condensable gases which have not been liquefied in their first passage through the condensers may be condensed and recovered in a later cycle.

Having described my invention, I claim:—

1. The mechanism which comprises a still containing heating tubes, means for circulating a heating fluid in contact with said tubes, means for delivering liquid hydrocarbon to said still so that the same shall flow through said tubes, fractionating means connected with said still, means for returning the fractionated liquid hydrocarbon to said still, means for condensing the fractionated vapors, means for heating the uncondensed vapors and means for passing the heated vapors back to the still and flowing the same through said heating tubes therein.

2. The mechanism which comprises a still containing a filter bed and a liquid collecting chamber, a set of heating tubes and means for circulating a heating fluid through said still in contact with said tubes, in combination with means for spraying liquid hydrocarbon in said still so that the same shall flow through said filter bed and the heating tubes, and means for delivering hydrocarbon vapors to said still so that the same shall flow through said tubes and filter bed in contact with liquid hydrocarbon in said still.

3. The mechanism which comprises a vertical still containing a filter bed and heating tubes discharging to the filter bed, means for circulating a heating fluid in contact with said tubes, means whereby liquid hydrocarbon may be passed downwardly through said filter bed and tubes and means for delivering hydrocarbon vapors to the bottom of said still and passing the same upwardly through said tubes and filter bed.

4. The mechanism which comprises a still containing a filter bed and heating tubes communicating therewith, means for circulating a heating fluid in contact with said tubes, means comprising a heat exchanger for conveying liquid hydrocarbon to and the distillate from said still, means for carrying liquid from said heat exchanger back to said still, means for condensing vapors from said heat exchanger, a compressor between the heat exchanger and the condensing means, means for heating the non-condensed vapors, and means for carrying the heated vapors to the still.

5. In the recovery of gasoline in liquid form from natural gas by absorption methods, the process comprising distilling from the absorption medium hydrocarbons absorbed thereby through contact with natural gas, at distillation temperatures below the final boiling point of the absorbed hydrocarbons, then compressing together substantially all of the vapors and gases evolved in the distilling step and substantially free of absorption medium, cooling the compressed vapors and gases and thereby forming a liquid gasoline fraction and a vapor and gas fractions, separating said fractions, reheating vapors and gases of said vapor and gas fraction, and returning the reheated vapors and gases into intimate contact with fresh quantities of absorption medium undergoing distillation in the distilling step, and passing the returned vapors and gases to the compression and cooling steps together with fresh quantities of vapors and gases distilled from absorption medium.

6. In the recovery of gasoline in liquid form from natural gas by absorption methods, the process comprising distilling from the absorption medium hydrocarbons absorbed thereby through contact with natural gas, at distillation temperatures below the initial boiling point of the absorption medium, then compressing together vapors and gases evolved in the distilling step, cooling the compressed vapors and gases and thereby forming a liquid gasoline fraction and a vapor and gas fraction, separating said fractions, subjecting vapors and gases of said vapor and gas fraction to heat, and then bringing said last mentioned vapors and gases together with fresh quantities of vapors and gases evolved in the distilling step and passing to the compressing and cooling steps.

7. In recovery of a mixture of hydrocarbons in liquid form from a mixture of gases and vapors by absorption, the process comprising distilling the hydrocarbons from the absorbent medium that contains them, subsequently compressing evolved vapors and gases substantially free of absorbent medium, cooling the compressed vapors and gases and thereby forming a liquid hydrocarbon fraction and a vapor and gas fraction, separating said fractions, reheating vapors and gases of said vapor and gas fraction, returning the reheated vapors and gases into intimate contact with fresh quantities of absorption medium undergoing distillation, and passing the returned vapors and gases to the compressing and cooling steps with vapors and gases evolved in the distilling step.

8. In recovery of a mixture of hydrocarbons in liquid form from a mixture of gases and vapors by absorption, the process comprising distilling the hydrocarbons from the absorbent medium that contains them, subsequently compressing evolved vapors and gases substantially free of absorbent medium, cooling the compressed vapors and gases and thereby forming a liquid hydrocarbon fraction and a vapor and gas fraction, separating said fractions, reheating vapors and gases of said vapor and gas fraction, and bringing the reheated vapors and gases together with fresh quantities of vapors and gases evolved in the distilling step and passing to said compressing and cooling steps.

9. In recovery of a mixture of hydrocarbons in liquid form from a mixture of gases and vapors by absorption, the process comprising supplying heat to absorbent medium containing absorbed hydrocarbons and distilling absorbed hydrocarbons from the absorbent medium that contains them, subsequently compressing evolved vapors and gases substantially free of absorbent medium, cooling the compressed vapors and gases and thereby forming a liquid hydrocarbon fraction and a vapor and gas fraction, separating said fractions, and bringing vapors and gases of said vapor and gas fraction together in the still with fresh quantities of vapors and gases evolved in the distilling step and passing to said compressing and cooling steps.

10. In recovery of a mixture of hydrocarbons in liquid form from a mixture of gases and vapors by absorption, the process comprising supplying heat to absorbent medium containing absorbed hydrocarbons and distilling absorbed hydrocarbons therefrom at temperatures below the initial boiling point of the absorbent medium, subsequently compressing evolved vapors and gases substantially free of absorbent medium, cooling the compressed vapors and gases and thereby forming a liquid hydrocarbon fraction and a vapor and gas fraction, separating said fractions, and bringing vapors and gases of said vapor and gas fraction together with fresh quantities of vapors and gases evolved in the distilling step, and passing the resulting mixture of vapors and gases in heated state to said compressing and cooling steps.

11. In recovery of a mixture of hydrocarbons in liquid form from a mixture of gases and vapors by absorption, the process comprising distilling the hydrocarbons from the absorbent medium that contains them, at temperatures below the final boiling point of the absorbed hydrocarbons, subsequently compressing evolved vapors and gases substantially free of absorbent medium, cooling the compressed vapors and gases and thereby forming a liquid hydrocarbon fraction and a vapor and gas fraction, separating said fractions, reheating vapors and gases of said vapor and gas fraction, returning the reheated vapors and gases into intimate contact with fresh quantities of absorption medium undergoing distillation, and passing the returned vapors and gases to the compressing and cooling steps with vapors and gases evolved in the distilling step.

12. In the recovery of gasoline in liquid form from natural gas by absorption methods, the process comprising distilling from the absorption medium by dry distillation the hydrocarbons absorbed thereby through contact with natural gas, subjecting the evolved vapors to temperatures and pressures that condense vaporized absorption medium while preserving desired gasoline hydrocarbons in vapor form, returning to the still condensed medium, compressing and cooling the still vapors and gases freed of medium, separating liquid gasoline from uncondensed vapors and gases, and returning such vapors and gases into contact with fresh quantities of absorption medium undergoing distillation.

13. In apparatus for recovering gasoline from an absorption medium for hydrocarbons, a still having an inlet for medium containing absorbed hydrocarbons and an outlet for denuded medium and an outlet for vapor and gas, means for supplying heat to the contents of the still to distill absorbed hydrocarbons from the medium therein, means for withdrawing absorption medium as a liquid from gases and vapors passing from the still and returning it to the still, a compressor for vapors and gases, a condenser receiving compressed vapors and gases from said compressor, means causing a heated mixture to be formed of gases and vapors not condensed in said condenser and fresh quantities of gases and vapors evolved by distillation in said still, and means for introducing the resultant mixture in a heated state into said compressor.

14. In apparatus for recovering gasoline from a hydrocarbon absorption medium, a still having an inlet for saturated medium and an outlet for denuded medium, means for supplying heat to the contents of said still, a fractionating means receiving vapors from the still and returning condensed liquid to the still and including means for withdrawing from substances passed therethrough a part of the heat contained therein, a compressor receiving vapors and gases from the fractionating means, a condenser receiving compressed vapors and gases from said compressor, means whereby gases and vapors not condensed in said condenser are brought together with fresh quantities of still vapors and gases passing to said compressor, and means for subjecting to heat vapors and gases passing from said condenser to said compressor.

15. In apparatus for recovering gasoline from a hydrocarbon absorption medium, a still having an inlet for saturated medium and an outlet for denuded medium, means for supplying heat to the contents of said still, a fractionating means receiving vapors from the still and returning condensed liquid to the still and including means for withdrawing from substances passing therethrough a part of the heat contained therein, a compressor receiving vapors and gases from the fractionating means, a condenser receiving compressed vapors and gases from said compressor, means for heating uncondensed vapors and gases from said condenser, and means for bringing such heated vapors and gases into contact with fresh quantities of absorbent medium in said still and into mixture with vapors and gases evolved in said still from the absorbent medium and passing to said compressor.

16. In the recovery of a mixture of hydrocarbons in liquid form from a mixture of gases and vapors by a method involving absorption of hydrocarbons from the mixture by liquid absorption medium, the steps comprising distilling absorbed hydrocarbons from the medium in which they were absorbed, passing together substantially all of the hydrocarbons distilled off in the distillation operation and in the form of vapors and gases and substantially free of absorption medium to a compressing operation and compressing said vapors and gases, cooling the compressed vapors and gases and thereby forming a liquid fraction and a vapor and gas fraction, withdrawing from the compressed and cooled hydrocarbons lower boiling hydrocarbon constituents thereof that are normally in vapor form under substantially atmospheric pressure and temperature, reheating said withdrawn lower boiling hydrocarbons, and passing such withdrawn and reheated hydrocarbons in the form of vapor and gas into contact with charged absorption medium undergoing distillation in said distilling operation and mixing such reheated lower boiling hydrocarbons with fresh quantities of vapors and gases evolved in said distilling step and passing to said compressing and cooling steps.

In testimony whereof I have hereunto set my name this 31st day of July, 1921.

ALEXANDER CLARKE.